Feb. 6, 1962 D. A. HILLENBRAND ETAL 3,019,920
LOAD SUPPORTING AND HANDLING MECHANISM FOR VEHICLES
Filed Nov. 30, 1959 11 Sheets-Sheet 8

INVENTORS.
Daniel A. Hillenbrand.
BY Wilbur W. F. Dieckmann.
Wood, Herron & Evans
ATTORNEYS.

Fig. 16

United States Patent Office 3,019,920
Patented Feb. 6, 1962

3,019,920
LOAD SUPPORTING AND HANDLING
MECHANISM FOR VEHICLES
Daniel A. Hillenbrand, Batesville, and Wilbur W. F.
Dieckmann, Napoleon, Ind., assignors to Batesville
Casket Company, Inc., Batesville, Ind., a corporation
of Indiana
Filed Nov. 30, 1959, Ser. No. 856,062
12 Claims. (Cl. 214—84)

This invention relates to roadway vehicles such as trailers and trucks, and is particularly directed to a vehicle arranged to transport burial caskets and similar bulky objects which are mounted upon individual pallets.

At the present time, it is the custom among manufacturers to haul burial caskets from the factory or warehouse in trucks or trailers for direct delivery to the undertaking establishments. However, the ordinary burial casket is heavy and difficult to handle; as a consequence, it would ordinarily require two men to lower a casket from the vehicle at its point of delivery. In order to facilitate unloading, the industry has developed hoist mechanisms which are mounted at the rearward end of the vehicle for vertical motion with respect to load-sustaining rails or the like within the vehicle. According to this system, the caskets are loaded in horizontal rows, one above the other, on the load-sustaining rails, such that the caskets may be pushed along the rails to the hoist mechanism to be lowered to the ground by the driver in making deliveries. A hoist mechanism of this general type is disclosed in the patent to W. E. Barrott, Jr., et al. Re. 23,718.

One of the primary objectives of the present invention has been to provide, for coaction with the hoist of this type, a load-sustaining structure which includes conveyor rollers adapted to engage the opposite ends of the casket-supporting pallets in loading and unloading, combined with means for lifting and supporting the loaded pallets above the conveyor rollers during road transport.

The conveyor arrangement is of particular advantage in the unloading operation since they permit the driver to advance the palletized caskets to the hoist mechanism in a rapid convenient manner. On the other hand, the lifting and supporting means serve to stabilize the loaded pallets within the vehicle for safety, and also prevent wearing of the conveyor rollers through shifting motions which are imparted to the loaded pallets during road transport. The conveyor rollers are also of advantage in loading the vehicle since they permit the entire load of palletized caskets to be transferred from a rack arranged to register endwisely with the conveyors of the vehicle. In utilizing the rack for loading purposes, the caskets are loaded upon the rack at the plant or warehouse in the order in which they are to be unloaded from the rearward end of the vehicle.

According to the invention, the support rails or shelves are arranged in pairs one above the other along the side walls of the vehicle so as to support the loaded pallets in crosswise position with respect to the vehicle body. Each rail assembly comprises a roller-type conveyor extending for the length of the vehicle, combined with a series of lift sections or skid plates residing parallel with the conveyor rollers. The skid plates are shiftable vertically to a raised or lowered position with respect to the plane of the conveyor rollers, such that the weight load of the pallets may be carried either by the skid plates or by the rollers.

During the loading operation, the skid plates reside in their lowered position, below the plane of the rollers, adapting the loaded pallets to be placed upon the rearward ends of the conveyors and advanced toward the forward end of the vehicle in a convenient manner. After the row of loaded pallets is in place, the skid plates are elevated collectively, so as to lift the ends of the pallets from the conveyor rollers, thereby to support the loaded pallets during road transport.

A further objective has been to provide an arrangement, whereby each pallet is supported upon an individual pair of skid plates, which may be shifted downwardly to lower the pallet upon the conveyor rollers for the orderly removal of individual caskets without lowering the other skid plates or disturbing the remainder of the load within the vehicle.

For this purpose, the individual skid plates are provided with wedge blocks which face downwardly in sliding engagement with companion wedge blocks mounted in a coacting position upon a fixed channel beneath the skid plates. The coacting wedge blocks include mating, inclined bearing surfaces terminating in flat areas, the arrangement being such that the inclined surfaces cam the skid plates to the elevated position when the skid plates are pushed forwardly. This arrangement makes it possible to lower the loaded skid plates individually by pushing successive endwise loaded pallets in the rearward direction, thus transferring the loaded pallet to the conveyor rollers for convenient transport to the hoist mechanism for unloading.

For lifting the loaded pallets from the conveyor rollers after the vehicle is loaded, each rail assembly is provided with a hydraulic ram which is arranged to shift the skid plates forwardly and upwardly. The apparatus is provided with a hydraulic pump, preferably hand operated, which is connected in common to the several rams, whereby the skid plates, with their loaded pallets, concurrently are elevated by operation of the pump. After the load has been elevated, the hydraulic rams retract automatically, adapting the individual pallets and associated skid plates to be shifted rearwardly and downwardly to the conveyor rollers for individual unloading.

In order to clamp the loaded pallets firmly in place upon the rail assemblies during road transport, each rail is provided with a detachable clamping device which forces the entire row of skid plates and loaded pallets forwardly against fixed abutments located at the forward end of the vehicle. When one of the caskets at the rearward end is to be unloaded, the clamping devices are disengaged and removed from the rails, permitting the rearmost pair of skid plates to shift rearwardly and to lower the pallet upon the conveyor rollers.

The present invention further embodies a lift structure combined with the hoist mechanism and arranged to separate the burial casket from its pallet at the loading point. For this purpose, the hoist mechanism includes pairs of lift arms adapted to be inserted between the pallet and casket at opposite ends, the lift arms being actuated by respective hand operated levers. After the casket is lowered by the hoist mechanism, the lift arms are shifted upwardly, thus separating the casket from its pallet so that it may be placed in the vehicle for reuse.

The various features and advantages of the invention will be more fully apparent to those skilled in the art from the following detailed description taken in conjunction with the drawings.

*General arrangement*

The casket handling mechanism of the present invention is illustrated in the drawings in relation to a roadway semitrailer as a preferred embodiment; however, it will be understood that the structure is intended for motor trucks and various other types of transport vehicles. The invention is primarily intended for burial caskets but the same principles may be utilized in transporting other types of merchandise which are loaded upon pallets for convenient transfer to or from the transport vehicle.

Figure 1:
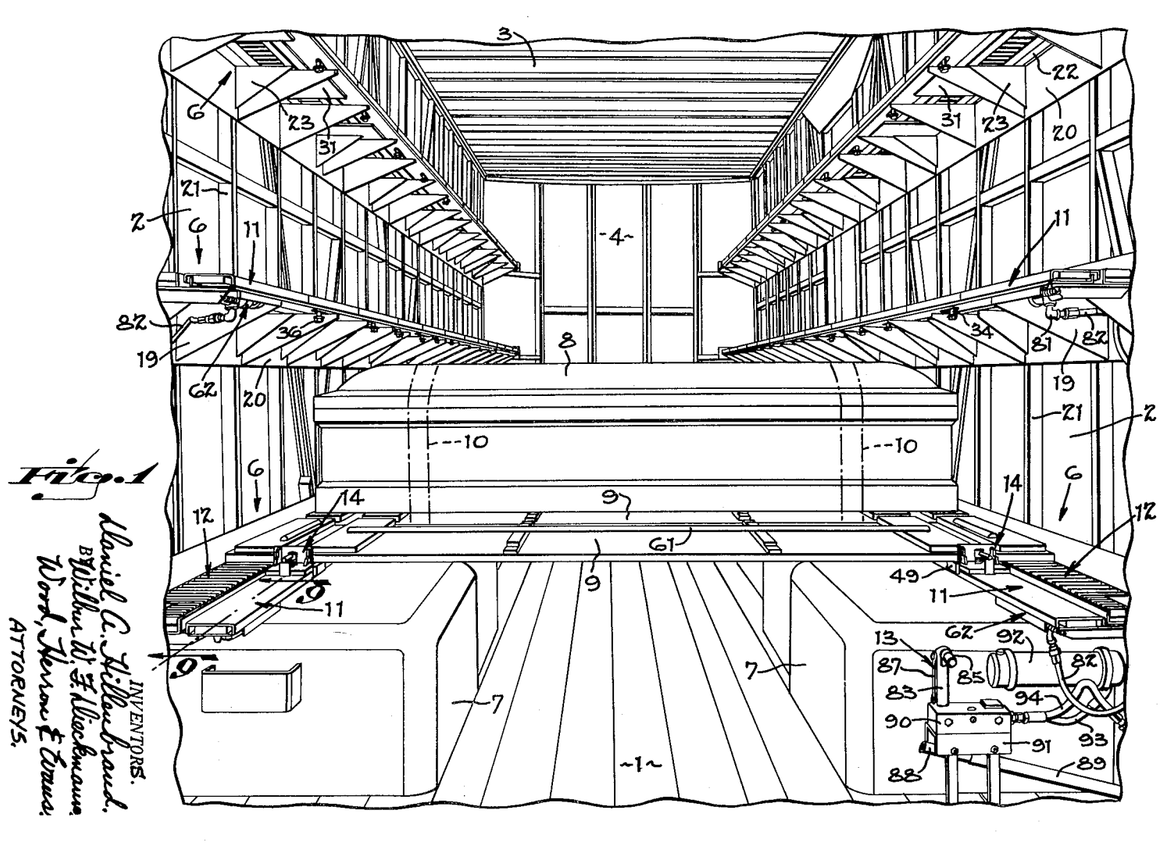
FIGURE 1 is a fragmentary perspective as viewed from the rearward end of a vehicle equipped with the casket handling mechanism of the present invention.

As best shown in FIGURE 1, the semitrailer in general comprises a floor 1 having a pair of side walls 2—2, with a roof structure 3 spanning the side walls. The forward end of the trailer includes a front wall 4, while the rearward end (FIGURE 2) is provided with an elevator or hoist mechanism, indicated generally at 5. The elevator or hoist moves vertically and into endwise registry with the pallet support structure for lowering the caskets relative to the vehicle, as explained later in detail.

As viewed in FIGURE 1, the trailer body, which is of standard width is provided with pairs of shelves or rail assemblies, indicated generally at 6, which are secured to the side walls. In the present example, the vehicle is provided with three pairs of rail assemblies mounted one above the other, the lowermost pair being disposed immediately above the wheel housings 7, which are located at the rearward portion of the vehicle. For convenience in handling, each casket 8 is secured upon a pallet 9 by means of straps 10, the opposite endwise portions of the pallets being supported by the rail assemblies.

As described below in detail, each rail assembly comprises a series of skid plates or lift sections 11 and a roller conveyor 12 extending parallel with the skid plates. The skid plates are arranged to be raised or lowered relative to the roller conveyors, such that the opposite end portions of the pallets 9 may be supported either by the conveyor or by the skid plates. The skid plates are long as the pallets are wide, there being provided one pair of skid plates for each pallet. As indicated generally at 13 (FIGURES 1 and 3), the vehicle is provided with a hand operated hydraulic pump for elevating the skid plates. The skid plates are shifted to their lowered position for the loading operation (FIGURES 9 and 12), such that the palletized caskets may be loaded upon the rearward ends of the conveyors and pushed forwardly along the conveyors to form solid rows one above the other. When fully loaded, the skid plates are elevated collectively to lift the pallets from the rollers (FIGURES 10 and 13), then a clamping device, indicated generally at 14 (FIGURES 1 and 6) is installed on each rail assembly to clamp the pallets in place during road transport.

When a casket is to be unloaded, the clamping devices are removed and the skid plates, which support that particular casket, are pushed rearwardly to permit the casket to be lowered, then advanced upon the conveyor rollers to the hoist mechanism to be lowered to the ground. The clamping devices are then replaced to lock the remaining portion of the load in place.

The hoist mechanism 5 is generally similar to the structure disclosed in the aforesaid Barrott Patent Re. 23,718 but includes, in addition, a device for lifting the casket from the pallet as the casket is unloaded. In general, the rearward end of the trailer body includes vertical posts 15—15 (FIGURES 2 and 4), which are generally channel-shaped in cross section. The hoist mechanism includes guide members (not shown) tracked within the posts and connected to sprocket chains or the like extending through the posts. The hoist mechanism further includes respective gate-like outriggers 16 having roller conveyors 17 which register with the casket-supporting roller conveyors within the trailer body at opposite sides. The outriggers 16 are pivotally connected to the hoist guide members and are arranged to swing to a closed position (FIGURE 2) during road transport, and to swing to the position of FIGURE 4 during the unloading operation. As indicated generally in FIGURE 4, the rearward end of the trailer body beyond the hoist mechanism includes rear doors, indicated at 18 which are hingedly joined to the side walls of the trailer body to enclose the rearward end of the vehicle and the hoist mechanism during road transport. Suitable latching mechanism (not shown) is provided for holding the doors firmly in closed position during road transport.

*Support rail structure*

Figure 2:
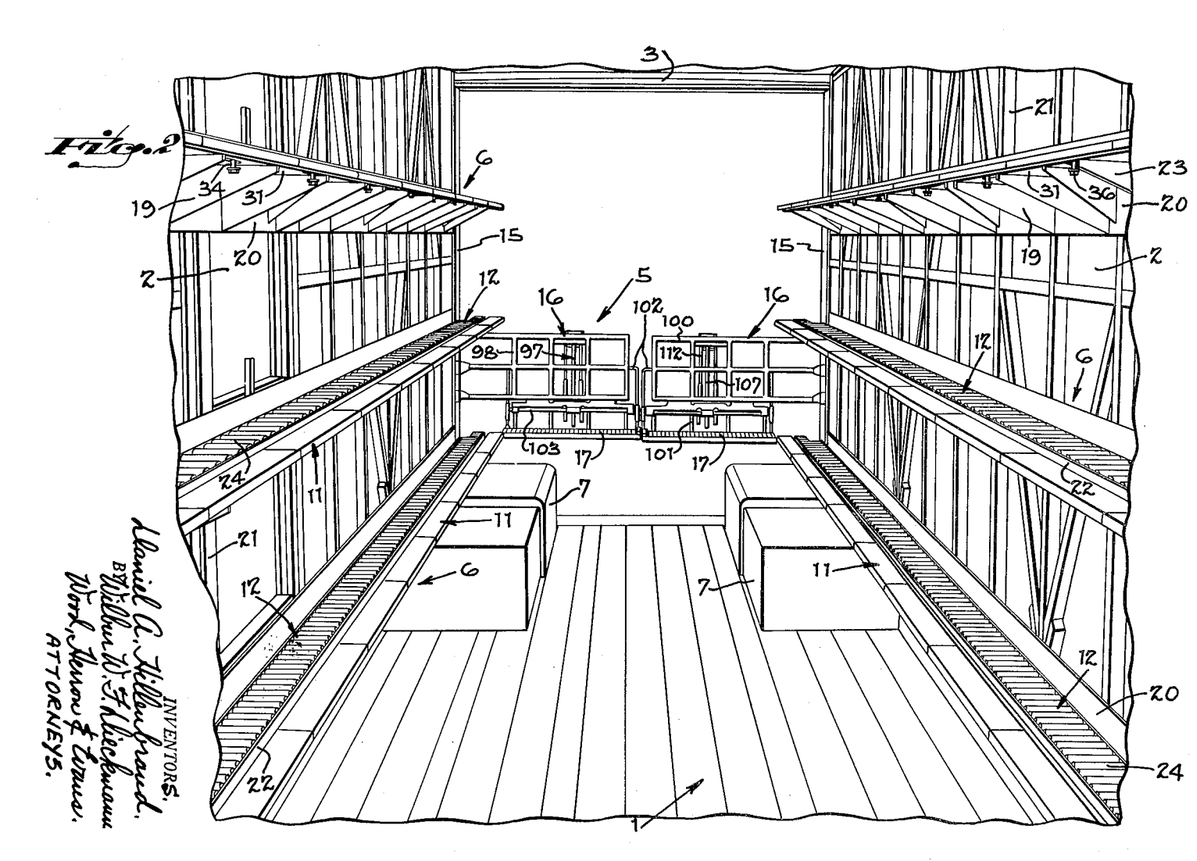
FIGURE 2 is a view similar to FIGURE 1, but looking from the inside toward the rearward end of the vehicle.

As shown generally in FIGURES 1 and 2, the roller conveyors 12 reside adjacent the side walls 2, while the skid plates 11 are disposed inwardly of the conveyor rollers at opposite sides. As noted earlier, the skid plate sections are shifted vertically with respect to the roller conveyors in order to raise or lower the pallets for road transport or for loading and unloading.

Figure 5:
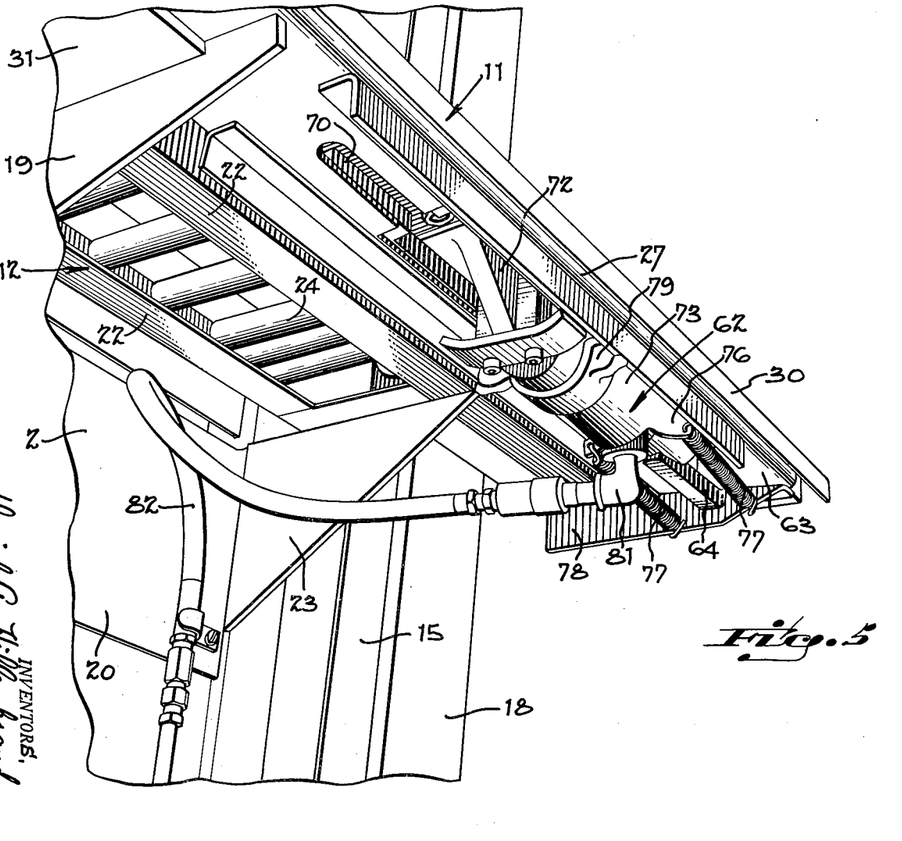
FIGURE 5 is a fragmentary perspective as viewed from beneath the rearward end of one of the rail assemblies, further illustrating the actuating ram thereof.
Figures 13, 14, 15:
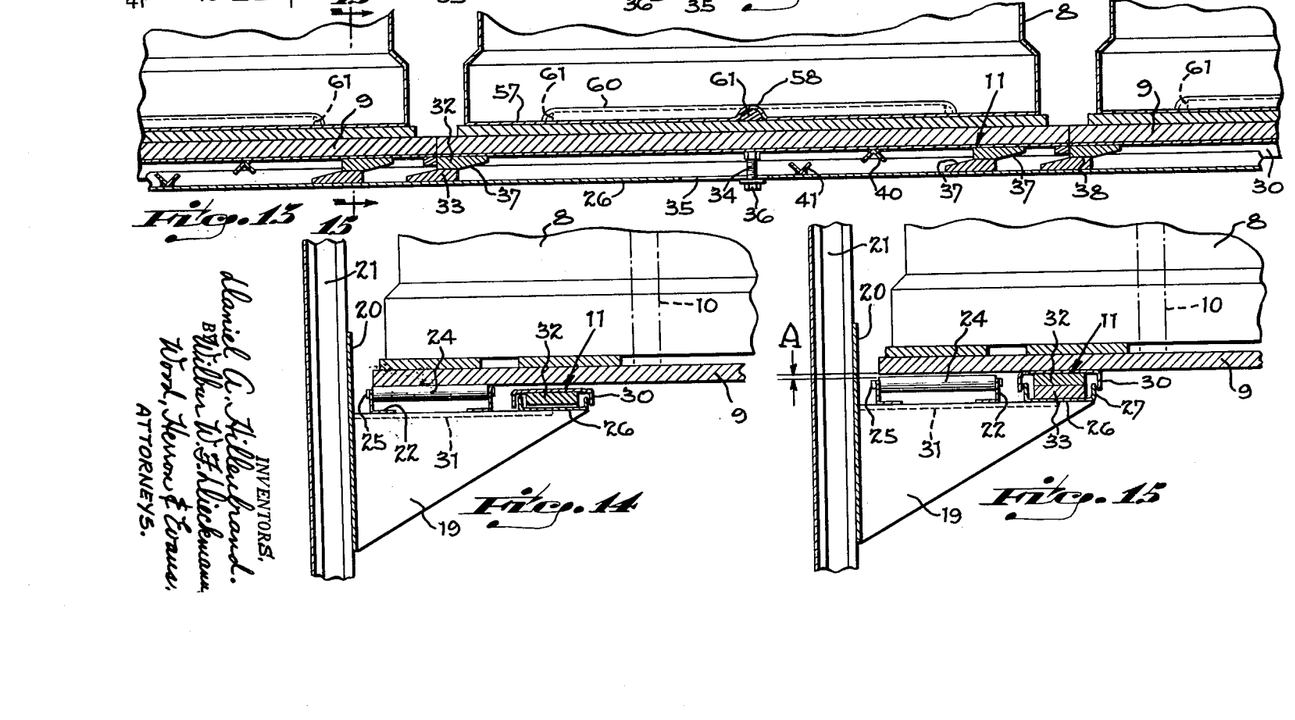
FIGURE 13 is a view similar to FIGURE 12, showing the skid sections shifted to the elevated position, with the pallets raised out of contact with the conveyor rollers for road transport after loading.
FIGURE 14 is a sectional view taken along line 14—14 of FIGURE 12, showing the skid section in its lowered position with the end portion of the pallet resting upon the conveyor rollers.
FIGURE 15 is a sectional view taken along line 15—15 of FIGURE 13, showing the pallet elevated with respect to the conveyor rollers.

Referring to FIGURES 1, 5 and 14, each composite rail assembly 6 is supported by a series of brackets 19 extending in cantilever fashion from a backing plate 20. The backing plate extends for the full length of the side wall, being rigidly secured to the posts 21 of the side wall. As seen in FIGURE 1, each bracket is in the form of a triangular plate, having its vertical edge preferably welded to the backing plate 20, the spacing of the brackets being such that each rail assembly 6 comprises a rigid unit which is capable of supporting the load without sagging.

The roller conveyors 12 each comprise spaced pairs of angle irons 22—22 welded or otherwise secured to the upper edge of a second series of brackets 23, similar to the brackets 19. Conveyor rollers 24 are rotatably journalled upon cross shafts 25 (FIGURE 6), which pass through the angle irons 22.

Figure 7:
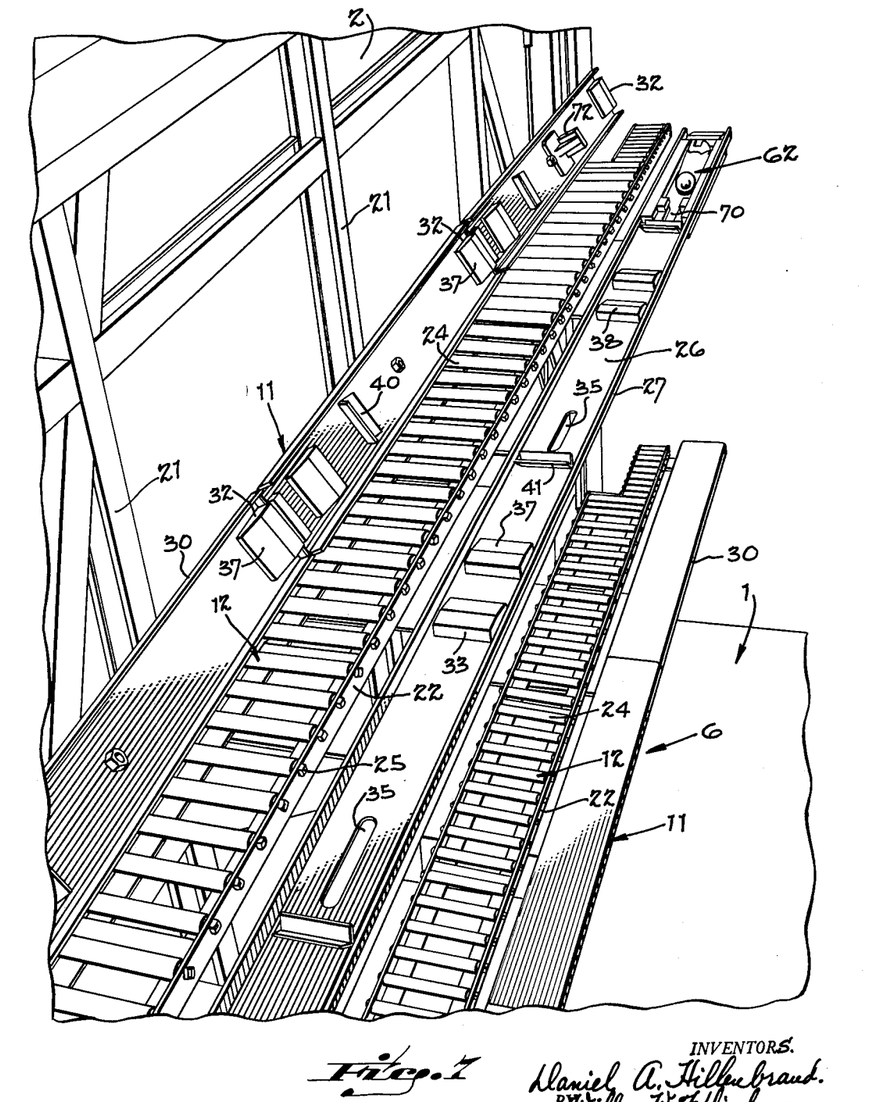
FIGURE 7 is a perspective view of the rail assembly with several of the skid plates removed to further illustrate the structure.

The skid plates or lift sections 11 (FIGURES 1, 4 and 7) are mounted upon a continuous lower channel 26 secured as by welding to the upper edges of the brackets 19, with the side flanges 27 of the channel facing upwardly. The skid plates or lift sections 11 comprise downwardly facing channels having flanges 30 loosely overlapping the flanges 27 of the lower channel. A series of horizontal plates 31 join the lower channel 26 to the angle irons 22 of the roller conveyor at spaced points along the length of the rail structure.

The skid plates 11 are elevated from the position shown in FIGURE 14 to the position shown in FIGURE 15 by opposed wedging blocks 32 and 33. These blocks are secured to the lower channel and skid plates and coact with one another. In its lowered position (FIGURE 14), the skid plates reside below the common plane of the conveyor rollers, with the end of the pallet resting upon the rollers. In the elevated position of the skid plate, the end of the pallet is lifted above the common plane of the conveyor rollers, as indicated at A (FIGURE 15). The structural details of the wedge blocks are disclosed in FIGURES 9–11 and 16, and are described later.

Each channel-shaped skid plate 11 includes a retainer bolt 34 having its head welded to the web of the channel, with the bolt projecting downwardly through an elongated slot 35 formed in the lower continuous channel 26. The lower end of the bolt includes a nut and washer 36 suitably locked in place and spaced downwardly below the web of channel 26. The retainer bolt is located intermediate the length of each skid plate and permits the skid plate to be shifted longitudinally and vertically but prevents complete removal of the skid plate from the continuous lower channel 26.

Figure 11:
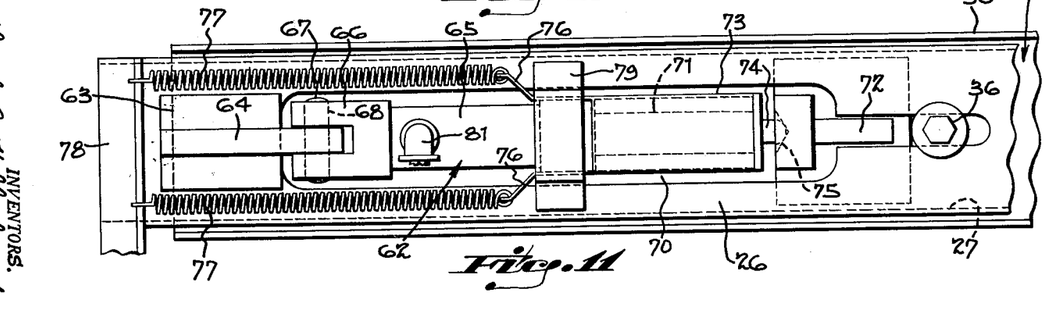
FIGURE 11 is a bottom view as projected from FIGURE 10.
Figure 12:
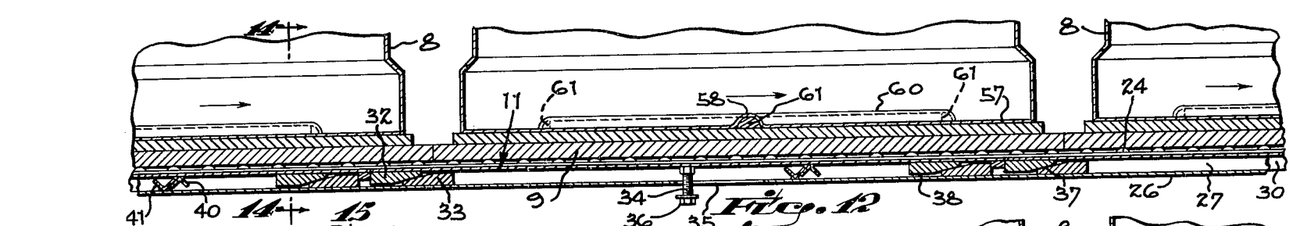
FIGURE 12 is a sectional view similar to FIGURE 9 with the skid sections in the lowered position and with the casket-supporting pallets resting upon the conveyor rollers during the loading operation.

As best shown in FIGURES 12 and 13, the wedge blocks 32 are mounted at the opposite end portions of the skid plates 11 for coaction with the mating blocks 33 of channel 26. The wedge blocks are secured as by welding to the respective channels. The upper and lower wedge blocks include inclined lift surfaces 37 (FIGURES 9, 11 and 16) which are in bearing engagement with one another. The inclined surfaces 37 lead to respective flats 38—38 which support the caskets in the elevated position above the rollers (FIGURES 14 and 15), when the skid plates are shifted forwardly.

Each skid plate 11 is further provided with a stop 40 (FIGURE 13) comprising an angle iron welded to the web of the skid plate and projecting downwardly therefrom in a position to engage a companion angle iron 41 welded to the web of the continuous channel 26. In the lowered position of the skid plates (FIGURES 12 and 14) the angle irons reside in contact with one another; when the skid plates are pushed forwardly to the elevated position (FIGURES 13 and 15), the angle iron 40 shifts forwardly from the angle iron 41.

The angle irons 40 and 41 are so positioned that their contact surfaces are inclined at an acute angle to the plane of the channels. Accordingly, in the lowered position of the skid plate, the flange of angle iron 40, which is attached to the skid plate, underlies the flange of angle iron 41. As the skid plate is shifted to its lowered position, the inclined meeting surfaces of the angle irons engage one another and limit the rearward and downward motion of the skid plate.

When the skid plate is shifted forwardly to its elevated position, the flats 38 of the opposed wedge blocks are in bearing engagement; therefore, there is no tendency for the skid plate to cam downwardly along the inclined surfaces 37 of the wedge blocks. It will be noted (FIGURE 13) that in the elevated position of the skid plate the retainer bolt 34 shifts forwardly of slot 35, with the nut and washer in bearing engagement with the web of channel 26. As viewed in FIGURES 9 and 10, the lift of the skid plate is less than the overlap of the channel flanges; therefore, the skid plates are locked against displacement relative to the lower channel by the retainer bolts.

Figure 8:
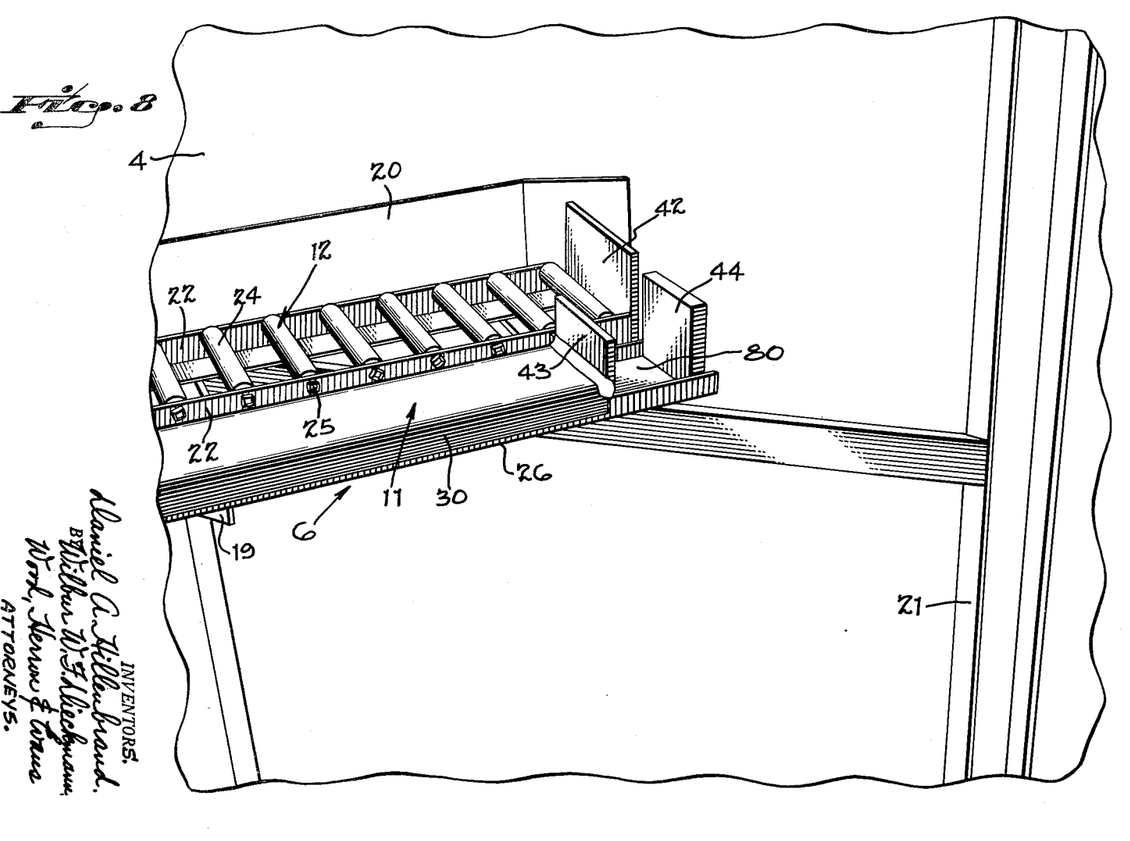
FIGURE 8 is a fragmentary perspective view, showing the pallet stops at the forward end of the rail assembly.

As noted previously, each rail assembly 6 is provided with an individual clamping device 14 which is detachably anchored between the adjacent ends of the skid plates 11, as the pallets are unloaded. The clamping device forces the row of pallets forwardly against the pallet stops 43 (FIGURE 8) which project upwardly from the end of the forward skid plate of the series. The clamp also forces the skid plates in the same direction against the skid plate stop 44, mounted on the lower channel. Each roller conveyor is also provided with an abutment block indicated at 42.

Figure 6:
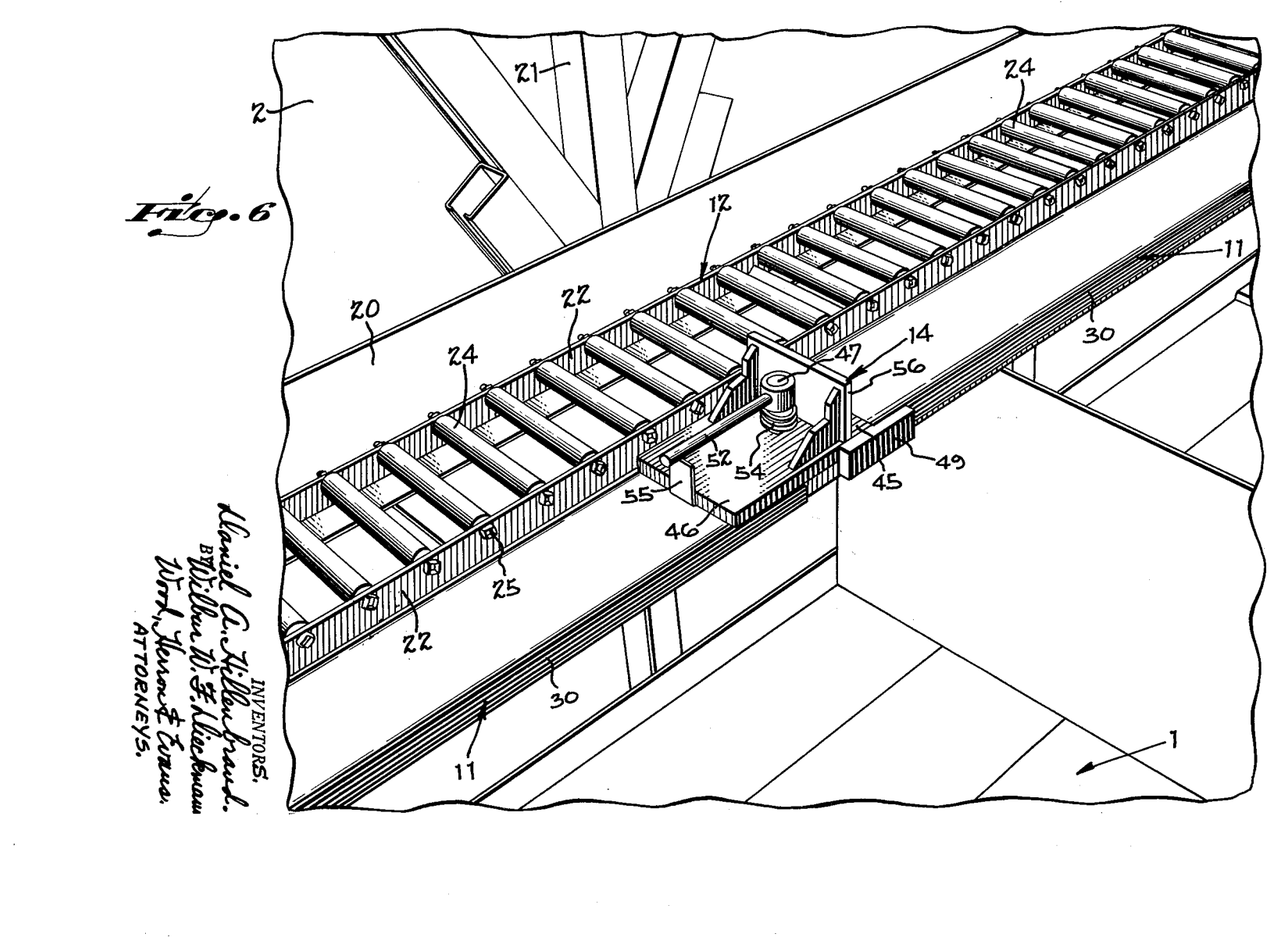
FIGURE 6 is a perspective view of the rail assembly illustrating one of the cam-actuated clamping devices which engage the rearward end of the row of pallets and skid plates.
Figure 16:
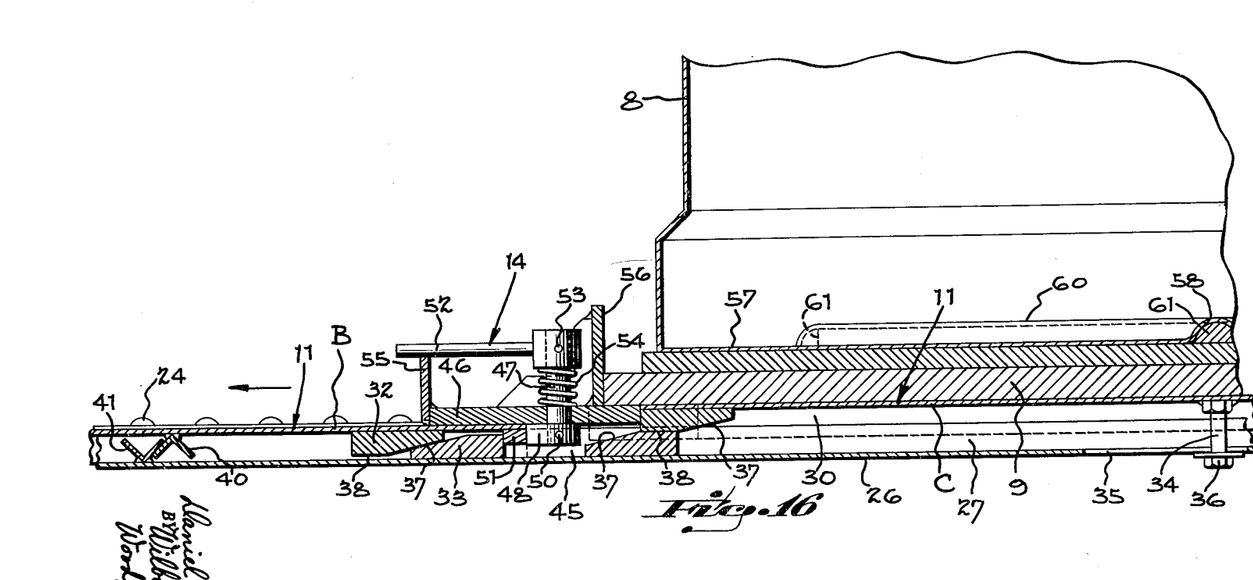
FIGURE 16 is a sectional view similar to FIGURE 9, showing the clamping device which clamps the end of the row of pallets and skid plates in elevated position, with the adjoining skid plate in its lowered position.

As shown in FIGURES 6 and 16, the clamping device 14 is cam-actuated and is inserted in the space 45 which is formed between the adjoining ends of the skid plates as the successive skid plates are shifted rearwardly. Thus, as viewed in FIGURE 16, the skid plate B has been shifted to its lowered position for unloading the casket, while the skid plate C remains in its elevated position. It will be noted in this view that the stops 40 and 41 of skid plate B are engaged, such that the clamping device reacts against skid plate B in forcing the skid plate C forwardly.

The clamping device 14 comprises a base plate 46 having a forward pair of guide blocks 49 (FIGURE 6) which straddle the skid plate 11. A cam shaft 47 is journalled in the base plate and its lower end includes a cam 48 (FIGURE 16) which is pinned as at 50 to the shaft. The cam is in bearing engagement with a cross bar 51 which is attached to the forward end of each skid plate for cam engagement. The cam is actuated by a hand lever 52 which is pinned as at 53 to the cam shaft. A coil spring 54 is interposed under compression between the base plate and hand lever to hold the cam in frictional engagement with the lower surface of the base plate. The outer end of the lever 52 engages the upper edge of a clip 55, which has a projection engaging the lever at the limit of camming action.

The forward end of the base plate 46 is provided with a pusher block 56 which engages the rearward edge of the pallet, while the forward edge of the base plate 46 engages the rearward end of the skid plate. Since the width of each pallet is substantially equal to the length of its skid plate, the pallets are clamped in side-by-side relationship between the block 56 of the clamp and the abutment block 43 of the forward skid plate.

As shown in FIGURE 16, the bottom 57 of the casket includes a longitudinal corrugation 58 and the opposite end portions include cross corrugations 60—60. The purpose of these corrugations is to rigidify the bottom panel and eliminate rumbling sounds. In the present example, the upper surface of each pallet is provided with correspondingly shaped strips 61 which interfit the corrugations, thereby to provide a keying action with respect to the casket resting thereon.

As explained later, the skid plates are shifted forwardly as a group from the lowered position to the elevated load-sustaining position by means of hydraulic rams through operation of the pump 13. As the caskets are unloaded from the vehicle, the clamping blocks 14 are removed, then the loaded pallet and its skid plate at the rearward end of the rail assembly is pushed by hand in the unloading direction.

During rearward movement, the flats 38 and inclined surfaces 37 permit the rearmost skid plate to be shifted to lowered position, while the forward skid plates remain elevated. As the skid plate is lowered, the ends of the pallet are transferred to the conveyor rollers to be advanced rearwardly to the hoist mechanism. The clamping devices 14 are then applied to the next row of pallets for road transport.

*Hydraulic apparatus*

As best shown in FIGURES 3–5 and 9–11, the skid plates are collectively shifted to the elevated position by hydraulic rams indicated generally at 62, there being provided an individual ram for each rail assembly. The rams are mounted at the rearward portion of the vehicle and are connected in common to the hydraulic pump, previously indicated at 13, such that the skid plates at both sides of the vehicle are elevated concurrently upon operation of the pump. The hydraulic system is so arranged that the rams are free to retract from the extended position after having elevated the skid sections, thereby to permit the skid sections to be lowered manually for unloading. The hydraulic rams 62 are commercial structures and for this reason the interior construction has been omitted from the drawings.

For mounting the ram, the rearward end portion of each lower channel 26 is provided with a bracket 63 welded to its lower surface and including a lug 64 which pivotally supports the ram cylinder 65. For this purpose, the cylinder includes a slotted head 66 interfitting the lug 64. A cross pin 67 passes through head 66 and engages a slot 68 (FIGURE 10) of lug 64, thus pivotally supporting the end of the ram cylinder.

In order to provide clearance for the ram, the rearward portion of the lower channel 26 is provided with an elongated opening 70, which has a length somewhat greater than the extended length of the ram (FIGURE 11). The plunger 71 of the ram is in driving connection with the rearward skid plate by means of a bracket 72 attached to the undersurface of the skid plate and projecting downwardly through the opening 70 of the lower channel. The plunger 71 engages a pusher cap 73 which telescopically interfits the ram cylinder 65. The forward end of cap 73 includes a rounded stud 74 seated in a recess 75 formed in the bracket 72. Advancement of the plunger 71 thus forces the cap 73 and skid plate forwardly from the position of FIGURE 9 to the position of FIGURE 10, while the ram pivots about the axis of cross pin 67 through the combined forward and upward motion of the skid plate.

The rearward end of the pusher cap 73 includes a pair of ears 76—76 to which are anchored respective tension springs 77—77. The rearward ends of these springs are anchored upon an angle iron 78 which is attached to the lower channel 26. As the plunger shifts from the retracted position, the tension springs are expanded, such that the plunger is constantly spring-loaded in the retracting direction.

The hydraulic system is provided with passageways through which the fluid discharges from the ram cylinder in response to contraction of the springs, the arrangement being such that the pusher cap 73 is retracted from the bracket 72 after the skid plates are shifted to the elevated position. As the pusher cap is retracted by the springs, its stud 74 shifts from the recess 75 of bracket 72, allowing the forward end of the ram to drop downwardly. The lower channel 26 is provided with a U-shaped cross strap 79 passing below the ram in a position to engage the pusher cap. When fully retracted, the ram is supported in the position of FIGURE 9, while the lug 72 resides in the position shown in broken lines for reengagement with the stud when the skid plate is shifted back to its lowered position, as shown in full lines. The overall stroke of the ram is somewhat greater than the motion required to elevate the skid plate from its lowered position. In the lowered position, the rearmost skid plate is spaced as at 80 from the abutment block 44, which is attached to the lower channel 26. As the ram is advanced, the skid plates advance in end-to-end relationship until the forward skid plate engages the abutment block 44, thus limiting the stroke of the ram.

Figure 9:
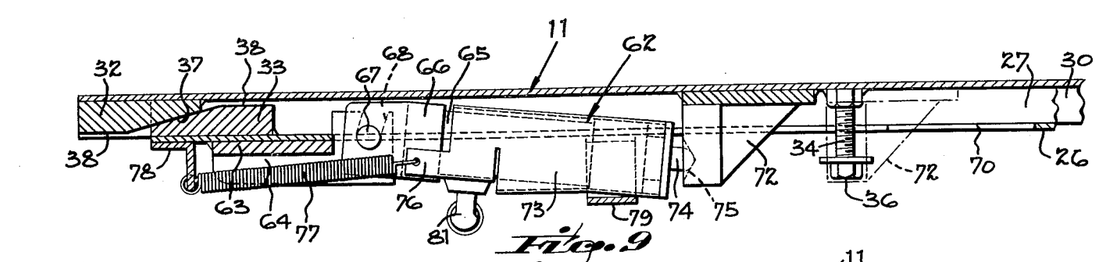
FIGURE 9 is a fragmentary sectional view taken along line 9—9 of FIGURE 1, illustrating the ram and associated parts, with the skid plate in its lowered position.
Figure 10:
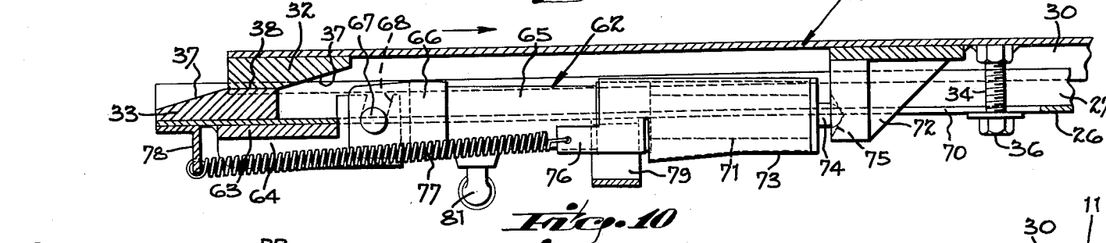
FIGURE 10 is a sectional view similar to FIGURE 9, showing the parts in elevated position.

As shown in FIGURES 9–11, fluid pressure is supplied to the ram cylinder 65 by way of the fitting 81 of conduit 82 which is in communication with the hydraulic pump 13. The ram arrangement of each rail assembly is identical, and each is provided with a similar conduit in communication with the pump for concurrent operation.

Figure 3:
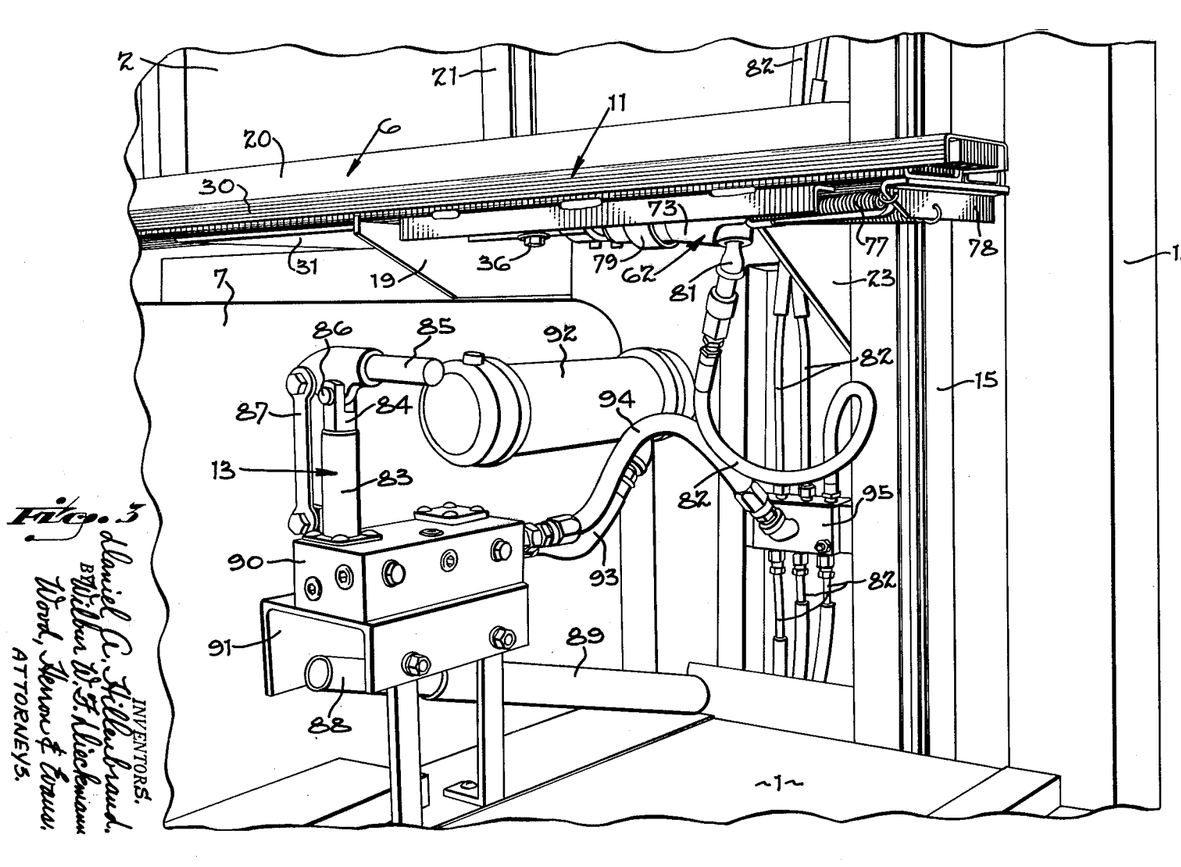
FIGURE 3 is a fragmentary perspective view showing the hydraulic pump and ram arrangement which elevates the palletized caskets from the conveyor rollers.

Referring to FIGURE 3, the pump 13 is a commercial structure, similar to the rams, and has not been illustrated in detail. In general, the structure comprises a cylinder 83 having a piston 84 which is actuated by a lever 85 pivotally connected as at 86 to the piston and linked as at 87 to the cylinder. In order to conserve space, the lever 85 is in the form of a stud which is arranged to interfit a lever extension 88 which is stored in a tube 89 when not in use. The pump cylinder 83 is mounted upon a reservoir 90 which is carried upon a support structure 91 adjacent the wheel housing 7, in a position convenient to the operator. Hydraulic fluid is supplied to the pump reservoir from an accumulator 92 which is secured to the wheel housing above the reservoir. The accumulator is connected to the reservoir by a conduit 93.

Upon operation of the pump, hydraulic fluid under pressure is advanced from the pump by way of conduit 94, which acts as a manifold, and is delivered to a junction block 95. The junction block is provided with internal passageways which directs fluid to six branch conduits 82. The branch conduits 82 which extend from the upper surface of the junction block are in communication with the rams at one side of the vehicle. The three branch conduits which extend from the lower surface of the junction block pass beneath the floor of the vehicle and are in communication with the rams on the opposite side of the vehicle.

In order to elevate the palletized caskets, the operator slips the tubular extension 88 upon the lever 85 and operates the pump to force hydraulic fluid from a reservoir 90 through the conduit 94. As the hydraulic fluid is displaced from the reservoir, the supply is replenished from the accumulator 92. The several tiers of skid plates are forced forwardly to the elevated position until the forward end of each skid plate is forced into engagement with the respective abutment blocks. At this point, the resistance on the pump increases, thereby indicating that the skid plates are fully elevated. As noted earlier, the pump and reservoir include suitable passageways allowing the hydraulic fluid to discharge back from the rams to the reservoir and accumulator (through operation of the springs 77) after the pumping operation. This allows the skid plates to be shifted manually to the lowered position for unloading the caskets.

*Hoist mechanism*

Figure 4:
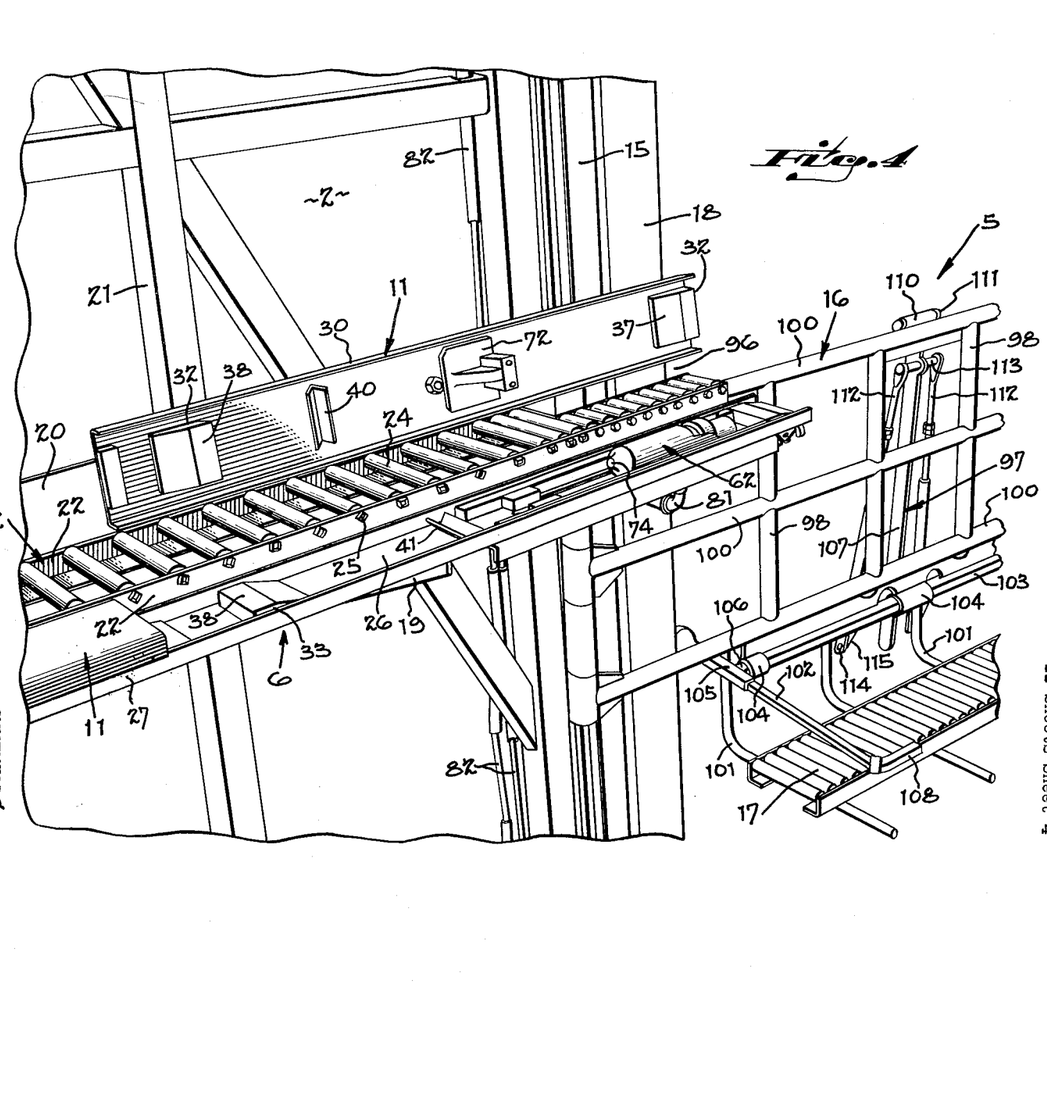
FIGURE 4 is a fragmentary perspective view with one of the elevating sections or skid plates swung back to illustrate the relationship of the wedge blocks and actuating ram.

As explained earlier, the hoist mechanism 5 (FIGURES 2 and 4) includes a pair of outriggers 16—16 including roller conveyors 17—17. During road transport, the outriggers are swung to the closed position of FIGURE 2 to permit the doors of the vehicle to be closed. When a casket is to be unloaded, the rear doors are swung to an open position well beyond the rearward opening of the vehicle body, then the outriggers are swung outwardly to the position of FIGURE 4. The hoist mechanism is then operated to shift the roller conveyors 17 of the hoist into endwise registry with the selected pair of rail assemblies to permit direct transfer of the casket from the rails to the hoist to be lowered to the ground. As seen in FIGURE 4, the endwise portion of the roller conveyors 12 of the vehicle are inset as at 96 to provide clearance for the outriggers during their vertical motion. Each outrigger is provided with a lift mechanism, indicated generally at 97, to lift the casket from its pallet after it has been lowered upon the hoist mechanism.

Each outrigger comprises a framework consisting of horizontal and vertical tubular members 98 and 100 joined together by welding. The conveyor section 17 is joined to the outrigger by angular pieces 101 projecting from the lower portion of the outrigger frame. The lift mechanism 97 comprises a pair of arms 102—102 one of which is shown in FIGURE 4. The arms 102 are adapted to be inserted between the bottom of the casket and pallet which is resting upon the hoist conveyors, so as to engage the opposite ends of the casket.

For mounting the lift arms 102, each outrigger is provided with a rotatable actuating tube 103, which is square in cross section and journalled for rotary motion in a series of bearing sleeves 104 attached to the lower portion of the outrigger. Each arm 102 is slidably mounted in a tube 105 which is also square in cross section and which is provided with a stud 106 slidably interfitting the actuating tube 103 so as to provide a non-rotatable connection between the arms and actuating tube.

During road transport, the pair of arms of each outrigger are removed from the opposite ends of the actuating tube 103 and are stored in upright position against the outriggers, as indicated in FIGURE 2. The pairs of lift arms are swung to an elevated position by means of a respective hand lever 107 mounted on the outriggers as explained below.

When a casket is to be lifted from its pallet, which is resting upon the hoist conveyor, the hand lever 107 is shifted to an elevated position, then the lift arms are inserted into the opposite ends of the actuating tube 103 with the end extensions 108 of the arms disposed between the pallet and casket. Each hand lever 107 includes a cross bar 110 pivotally connected as at 111 to the top rail 100 of the outrigger.

Respective pairs of push rods 112—112 are pivotally connected as at 113 to the upper portion of each hand lever 107 adjacent its pivoted upper end, and the lower ends of the push rods are pivotally connected as at 114 to respective lever extensions 115 which are secured to the actuating tube 103. In operating the lift, the hand lever 107 is forced downwardly causing the tube 103 to be rotated in a direction which swings the left arms 102 upwardly. The pivotal connections of the hand lever and push rods provide a toggle action when the lever is swung downwardly to the position shown in FIGURE 4. In this position, the pivot points create a self-locking action, so as to hold the arms in the elevated position, with the casket supported above its pallet. With both ends of the casket thus supported, the pallet is removed and the casket is delivered to its destination.

*Operation*

Since the trailer is intended for delivering the burial caskets individually to various destinations, the palletized caskets are loaded into the vehicle in the reverse order of delivery, so that the first caskets to be unloaded are disposed at the rearward end of the vehicle. In the preferred arrangement, the palletized caskets are loaded upon a rack at the factory, the rack being provided with conveyors arranged in tiers corresponding to the rail assemblies of the vehicle. The rack is shifted to a position in endwise alignment with the vehicle rails and the rows of palletized caskets are pushed directly into the vehicle.

As explained earlier, the skid plates are shifted to their lowered position during the loading operation so that the ends of the caskets are carried upon the conveyor rollers as they are pushed into the vehicle. After the load is in place, the operator actuates the hydraulic pump 13 with the handle extension, causing the rams to shift the skid plates forwardly and upwardly, thereby to transfer the weight load from the conveyor rollers to the skid plates. The clamping devices 14 are then applied to the rails and actuated to clamp the pallets and skid plates collectively in the forward position.

At the unloading point, the operator simply removes the clamping devices from the rails of the rearward casket, then forces the casket manually toward the rear, causing the skid plates to slide rearwardly and downwardly to the lowered position, thus transferring the pallet to the rollers of the conveyor. The mechanism is then operated to elevate the hoist conveyor to a position to receive the casket and to lower it to the ground. During these operations, the remaining caskets of the load remain in their elevated position with respect to the conveyor rollers, so that the operator simply replaces the clamping devices after the selected casket has been removed. After the casket is lowered by the hoist mechanism, the lift lever 107 may be actuated to raise the casket from the pallet, permitting the pallet to be placed in the vehicle for reuse.

Having described our invention, we claim:

1. In a vehicle body having side walls and a rearward opening, a support structure adapted to support loaded pallets in horizontal rows one above the other, said support structure comprising, respective pairs of horizontal rail assemblies mounted one above the other relative to the side walls of the vehicle, each of said rail assemblies comprising a fixed rail, a conveyor extending parallel with the fixed rail, a series of skid sections mounted above the fixed rail in end-to-end relationship, and actuating means engageable with the rearmost skid section of said end to end series and adapted to thrust said series of skid sections collectively in a forward direction relative to the fixed rail, lift means interposed between the fixed rail and skid sections and adapted to elevate the skid sections collectively in response to the forward motion thereof, said skid sections, in a lowered position, residing below the plane of said conveyors and residing above said plane when shifted to the elevated position, said conveyors adapted to engage the opposite ends of the loaded pallets and support the same for advancement of the pallets relative to the vehicle with the skid sections in said lowered position, said skid sections adapted to engage and lift the opposite ends of the pallets from the conveyors and to support the same during road transport of the vehicle, said actuating means adapting the skid sections to be shifted individually from the elevated position to the lowered position, thereby to transfer the loaded pallets individually to the conveyor for unloading the same.

2. In a vehicle body having side walls and a rearward opening, a support structure adapted to support loaded pallets in horizontal rows one above the other, said support structure comprising, respective pairs of horizontal rail assemblies mounted one above the other relative to the side walls of the vehicle, each of said rail assemblies comprising a fixed rail, a conveyor extending parallel with the fixed rail, a series of skid sections mounted in end to end relationship above the fixed rail, wedge means interposed between the fixed rail and skid sections, and actuating means engageable with the rearmost skid section of said series and adapted to thrust the end to end series of skid sections and wedge means collectively in a longitudinal direction and thereby to elevate said skid sections collectively relative to the fixed rail through operation of said wedge means, said skid sections, in a lowered position, residing below the plane of said conveyor and residing above said plane when shifted to the elevated position, said conveyors adapted to engage the opposite ends of the loaded pallets and support the same for advancement from the rearward to the forward end of the vehicle with the lift sections in said lowered position, said lift sections adapted to engage and lift the opposite ends of the pallets from the conveyors and to support the same during road transport of the vehicle, said actuating means being shiftable to a disengaged position in rearwardly spaced relationship to the rearmost skid section, thereby adapting the end to end series of skid section, starting with the rearward section, to be shifted individually in an opposite longitudinal direction, said wedge means adapting the skid sections to be shifted individually from the elevated position to the lowered position upon being shifted longitudinally in said opposite direction, thereby to transfer the loaded pallets individually to the conveyor for unloading the same.

3. In a vehicle body having side walls and a rearward opening, a support structure adapted to support loaded pallets in horizontal rows one above the other, said support structure comprising, respective pairs of horizontal rail assemblies mounted one above the other relative to the side walls of the vehicle body, each of said rail assemblies comprising, a fixed rail secured to the side wall, a series of skid sections disposed in end to end relationship and mounted relative to the fixed rail, a conveyor extending parallel with the skid sections, coacting wedge elements mounted on said fixed rail and skid sections, said coacting wedge elements having inclined lift surfaces in bearing engagement with one another leading to flat load-supporting surfaces, actuating means adapted to engage the rearmost skid section of said series and to thrust said end to end series of skid sections collectively in a forward direction relative to said fixed rail, thereby to elevate said skid sections relative to the conveyors and to support the skid sections with said flat surfaces of the wedge elements in bearing engagement, said conveyors adapted to engage the opposite ends of the loaded pallets, adapting the pallets to be loaded upon the rearward end of the conveyors and advanced to the forward end of the vehicle with said skid sections in a lowered position, said skid sections adapted to engage and lift the opposite ends of said pallets from said conveyors upon being elevated, whereby the loaded pallets are supported above said conveyors during road transport of the vehicle, said actuating means being shiftable to a disengaged position in rearwardly spaced relationship to the rearmost skid section, thereby adapting the skid sections to be shifted individually in the rearward direction, said wedge elements adapting the skid sections to be shifted individually from the elevated position to the lowered position, upon being shifted in said rearward direction thereby to transfer the loaded pallets individually to the conveyors for unloading the same.

4. In a vehicle having side walls and a rearward opening, a support structure adapted to support loaded pallets in horizontal rows one above the other, said support structure comprising, respective pairs of horizontal rail assemblies mounted one above the other relative to the side walls of the vehicle body, each of said rail assemblies comprising a fixed rail secured to the side wall, a series of skid sections disposed in end to end relationship and mounted relative to the fixed rail, a conveyor extending parallel with the skid sections, said conveyors adapted to engage the opposite ends of said pallets, coacting wedge elements mounted on said fixed rail and skid sections, said coacting wedge elements having inclined lift surfaces in bearing engagement with one another and adapted to lift the skid sections upon longitudinal motion thereof toward the forward end of the vehicle, a fluid pressure ram interconnecting the fixed rail and rearmost skid section of said end to end series, and means for supplying fluid pressure concurrently to the ram of each rail assembly, said rams adapted to thrust said rearmost skid section and the said end to end series of skid sections longitudinally relative to said fixed rail toward one end of the vehicle, thereby to elevate said skid sections relative to the conveyors through operation of the said coacting wedge elements, and to support the skid sections, said conveyors adapting the pallets to be loaded upon the rearward end of the vehicle and advanced to the forward end thereof with said skid sections in a lowered position, said skid sections adapted to engage and lift the opposite ends of said pallets from said conveyors upon being shifted forwardly, whereby the loaded pallets are supported above said conveyors during road transport of the vehicle, said fluid pressure ram adapted to be shifted to a disengaged position relative to the rearmost skid section, thereby adapting the individual skid sections, starting with the rearmost skid section, to be shifted longitudinally relative to the fixed rail in a direction to lower said skid sections relative to the conveyors through operation of said coacting wedge elements, thereby to transfer the loaded pallets individually to the conveyor for unloading the same.

5. In a vehicle having side walls and a rearward opening, a support structure adapted to support loaded pallets in horizontal rows one above the other, said support structure comprising, respective pairs of horizontal rail assemblies mounted one above the other relative to the side walls of the vehicle body, each of said rail assemblies comprising, a fixed rail secured to the side wall, a series of skid sections disposed in end to end relationship and mounted relative to the fixed rail, a conveyor extending parallel with the skid sections, said conveyors adapted to engage the opposite ends of said pallets, coacting wedge elements mounted on said fixed rail and skid sections, said coacting wedge elements having inclined lift surfaces in bearing engagement with one another leading to flat load bearing surfaces, said inclined lift surfaces adapted to elevate the skid sections upon longitudinal motion thereof toward the forward end of the vehicle, a bracket element projecting downwardly from the rearmost skid section of said series, a fluid pressure ram connected to the fixed rail, said ram having a thrust element projecting forwardly therefrom and adapted to engage the bracket element of the rearmost skid section, and means for supplying fluid pressure concurrently to the ram of each rail assembly, the thrust element of said rams adapted to shift said series of skid sections longitudinally relative to said fixed rail toward the forward end of the vehicle, thereby to elevate said skid sections relative to the conveyors through operation of coacting wedge elements, thereby to support the same with said flat load bearing surfaces in bearing engagement, said conveyors adapting the pallets to be loaded upon the rearward end of the conveyor and advanced to the forward end of the vehicle with said skid sections in a lowered position, said skid sections adapted to engage and lift the opposite ends of said pallets from said conveyors upon being shifted forwardly, whereby the loaded pallets are supported above said conveyors during road transport of the vehicle, the thrust elements of said rams adapted to shift to a retracted position spaced rearwardly from the said bracket elements after shifting the skid sections forwardly to said elevated position, said wedge elements thereafter adapting the skid sections to be shifted individually in a rearward direction, adapting the said skid sections to be shifted from the elevated position to the lowered position, thereby to transfer the loaded pallets individually to the conveyors for unloading the same.

6. In a vehicle having side walls and a rearward opening, a rail structure adapted to support loaded pallets or the like in horizontal rows one above the other, said rail structure comprising, respective pairs of horizontal rail assemblies mounted one above the other relative to the side walls, each of said rail assemblies comprising a fixed rail member extending along the side wall, a series of conveyor rollers mounted parallel with said fixed rail, a series of skid sections mounted in end to end relationship above said fixed rail, a plurality of wedge blocks interposed between the fixed rail and each of said skid sections adapted to elevate the skid sections above the plane of said conveyor rollers upon longitudinal movement of the skid sections from a rearward portion relative to the fixed rail, actuating means engageable with the rearmost skid section of each series of skid section and adapted to thrust the end to end series of skid sections in said longitudinal direction, the conveyor rollers of said rail assemblies being arranged to engage the opposite ends of the rows of pallets, adapting the pallets to be loaded into the rearward end of the vehicle and advanced along said conveyor rollers toward the forward end thereof with said skid sections in a lowered position, said skid sections adapted to engage and lift the rows of pallets from said conveyor rollers upon being shifted longitudinally and to support the pallets during road transport of the vehicle, said actuating means adapted to shift to a disengaged position in rearwardly spaced relationship with the rearmost skid section, whereby said skid sections are adapted to be shifted individually in said longitudinal direction to a lowered position, thereby to lower said pallets individually to said conveyor rollers upon being shifted toward the rearward end of the vehicle for unloading the pallets individually from the rearward end of the vehicle, and clamping devices adapted to be mounted upon said rail assemblies in a position to engage the pallets remaining on said skid sections and to force the same forwardly of the vehicle.

7. In a vehicle having side walls and a rearward opening, a rail structure adapted to support loaded pallets or the like in horizontal rows one above the other, said rail structure comprising, respective pairs of horizontal rail assemblies mounted one above the other relative to the side walls, each of said rail assemblies comprising a fixed rail member extending along the side wall, a series of conveyor rollers mounted parallel with said fixed rail, a series of skid sections mounted in end to end relationship above said fixed rail, a plurality of wedge blocks interposed between the fixed rail and each of said skid sections adapted to elevate the skid sections above the plane of said conveyor rollers upon forward movement of the skid sections from a rearward position relative to the fixed rail, actuating means engageable with the rearmost skid section of each series, said actuating means adapted to thrust said end to end series of skid sections collectively in said forward direction, the conveyor rollers of said rail assemblies being arranged to engage the opposite ends of the rows of pallets, adapting the pallets to be loaded into the rearward end of the vehicle and advanced along said conveyor rollers toward the forward end thereof with said skid sections in a lowered position, said skid sections adapted to engage and lift the rows of pallets from said conveyor rollers upon being shifted forwardly and to support the pallets during road transport of the vehicle, said actuating means adapted to shift to a retracted position spaced rearwardly from the rearmost skid section, whereby said skid sections are adapted to be shifted individually in a rearward direction to a lowered position, thereby to lower said pallets individually to the said conveyor rollers when the skid sections, with the pallet resting thereon, is shifted toward the rearward end of the vehicle for unloading the pallets individually from the rearward end of the vehicle, whereby the lowered skid sections at opposite sides are spaced rearwardly from the adjoining skid sections, and clamping devices adapted to be inserted in the space between the lowered skid section and the adjoining elevated skid section at opposite sides of the vehicle, said clamping devices including spreader means adapted to act against the rearmost skid section and to force said pallets toward the forward end of the vehicle for road transport.

8. In a vehicle having side walls and a rearward opening, a rail structure adapted to support loaded pallets or the like in horizontal rows one above the other, said rail structure comprising, respective pairs of horizontal rail assemblies mounted one above the other relative to the side walls, each of each rail assemblies comprising a fixed rail member extending along the side wall, a series of conveyor rollers mounted parallel with said fixed rail, a series of skid sections mounted in end to end relationship above said fixed rail, wedge blocks interposed between the fixed rail and skid sections adapted to elevate the skid sections above the plane of said conveyor rollers upon forward movement of the skid sections from a rearward position relative to the fixed rail, actuating means for shifting said skid sections in said forward direction, the conveyor rollers of said rail assemblies being arranged to engage the opposite ends of the rows of pallets, adapting the pallets to be loaded into the rearward end of the vehicle and advanced along said conveyor rollers toward the forward end thereof with said skid sections in a lowered position, said skid sections adapted to engage and lift the rows of pallets from said conveyor rollers upon being shifted forwardly and to support the pallets during road transport of the vehicle, said skid sections adapted to lower said pallets individually to the said conveyor rollers when the skid sections, with the pallet resting thereon, are shifted toward the rearward end of the vehicle for unloading the pallets individually from the rearward end of the vehicle, coacting stop means on said fixed rails and skid sections adapted to limit the rearward motion of the skid sections to said lowered position, whereby the lowered skid sections at opposite sides are spaced rearwardly from the adjoining skid sections, and clamping devices adapted to be inserted into the space between the lowered and elevated skid sections at opposite sides of the vehicle, said clamping devices each including a cam element adapted to act against the lowered skid section which is in engagement with said coacting stop means for forcing the elevated pallets toward the forward end of the vehicle for road transport.

9. In a vehicle having side walls and a rearward opening, a support structure adapted to support loaded pallets in horizontal rows one above the other, said support structure comprising, respective pairs of rail assemblies mounted one above the other relative to the side walls of the vehicle, each of said rail assemblies comprising a fixed channel member mounted along the side wall and having opposed side flanges projecting upwardly, a series of skid plates in endwise relationship mounted above said fixed channel, said skid plates comprising channel members having opposed side flanges extending downwardly and overhanging the side flanges of the fixed channel member, coacting wedge blocks mounted respectively on said fixed channel and skid plates, said wedge blocks having upwardly inclined lift surfaces leading to flat load bearing surfaces, a series of conveyor rollers extending alongside the skid plates, said wedge blocks adapting said skid plates to reside in a lowered position below the plane of said conveyor rollers and adapted to elevate said skid plates above said plane upon forward motion of the skid plates relative to the fixed channel, actuating means for shifting said skid plates collectively in said forward direction, said conveyor rollers adapted to engage the opposite ends of said loaded pallets for advancement from the rearward to the forward end of the vehicle with said skid plates in lowered position, said actuating means adapted to shift the skid plates forwardly, whereby the upwardly inclined surfaces and flat load bearing surfaces of the wedge blocks are shifted relative to one another to elevate the skid plates and pallets and to support the same with the flat load bearing surfaces in bearing engagement during road transport of the vehicle.

10. In a vehicle having opposed side walls and a rearward opening, a structure for supporting palletized caskets in horizontal rows one above the other and for loading and unloading the same from the vehicle, said structure comprising, respective conveyors mounted one above the other in said vehicle, a series of pallet skid elements extending along said conveyors, actuating means for shifting said skid elements relative to the plane of the conveyors, said skid elements adapted to reside below the plane of the conveyors and said conveyors adapted to engage the opposite ends of the pallets for advancement from the rearward to the forward end of the vehicle as the palletized caskets are loaded therein, said skid elements adapted to engage and support the pallets above the conveyors upon operation of the actuating means for road transport of the vehicle, said skid elements adapted to be shifted individually from the elevated position to transfer the pallets individually to the conveyors for unloading the same, a hoist mechanism mounted at the rearward end of the vehicle adapted to move vertically into endwise registry with said conveyors, whereby the pallets may be advanced from said conveyors to the hoist mechanism for unloading the same, respective pairs of lift elements mounted on said hoist mechanism, said lift elements adapted to be inserted between the pallet and casket at opposite ends thereof, and means for shifting said lift elements upwardly, thereby to elevate the casket above the pallet for removal of the pallet.

11. In a vehicle having opposed side walls and a rearward opening, a structure for supporting palletized caskets in horizontal rows one above the other and for loading and unloading the same from the vehicle, said structure comprising respective conveyors mounted one above the other in said vehicle, a series of pallet skid elements extending along said conveyors, actuating means for shifting said skid elements relative to the plane of the conveyors, said skid means adapted to reside below the plane of the conveyors and said conveyors adapted to engage the opposite ends of the pallets to support the same for advancement from the rearward to the forward end of the vehicle as the palletized caskets are loaded therein, said skid means adapted to engage and support the pallets above the conveyors upon operation of the actuating means for road transport of the vehicle, said skid elements adapted to be shifted individually from the elevated position to transfer the pallets individually to the conveyors for unloading the same, a hoist mechanism mounted at the rearward end of the vehicle, hoist conveyors on said hoist mechanism adapted to be shifted vertically into endwise registry with the conveyors of the vehicle, adapting the palletized caskets to be transferred to the hoist conveyors with the opposite ends of the palletized casket supported by the hoist conveyors, respective pairs of lift arms pivotally mounted upon the hoist mechanism at opposite sides thereof, actuating means for pivoting said lift arms from a lowered to an elevated position, said lift arms, in said lowered position, adapted to be inserted between the pallet and casket at opposite ends, said actuating means adapted to swing said lift arms to an elevated position and to lock the same in said elevated position, thereby to lift and support the casket above the pallet for removal of the pallet when the casket is unloaded.

12. In a vehicle having opposed side walls and a rearward opening, a structure for supporting palletized caskets in horizontal rows one above the other and for loading and unloading the same from the vehicle, said structure comprising respective conveyors mounted one above the other in said vehicle, a series of pallet skid elements extending along said conveyors, actuating means for shifting said skid elements relative to the plane of the conveyors, said skid means adapted to reside below the plane of the conveyors and said conveyors adapted to engage the opposite ends of the pallets to support the same for advancement from the rearward to the forward end of the vehicle as the palletized caskets are loaded therein, said skid means adapted to engage and support the pallets above the conveyors upon operation of the actuating means for road transport of the vehicle, said skid elements adapted to be shifted individually from the elevated position to transfer the pallets individually to the conveyors for unloading the same, a hoist mechanism mounted at the rearward end of the vehicle adapted to receive the palletized casket from said conveyors, respective pairs of lift arms pivotally mounted upon the hoist mechanism at opposite sides thereof, a respective toggle linkage interconnected with each of said pairs of lift arms including respective hand levers for actuating the lift arms, said lift arms, when in a lowered position, adapted to be inserted between the pallet and casket at opposite ends, said toggle linkage adapted to swing said lift arms to an elevated position upon actuation of said hand lever and to lock the lift arms in said elevated position, thereby to lift and support the casket above the pallet for removal of the pallet when the casket is unloaded.

References Cited in the file of this patent
UNITED STATES PATENTS

| | | |
|---|---|---|
| 707,465 | Vogel | Aug. 19, 1902 |
| 1,809,540 | Young | June 9, 1931 |
| 2,635,771 | Black | Apr. 21, 1953 |
| 2,693,286 | Cocks | Nov. 2, 1954 |
| 2,949,992 | Weinberg | Aug. 23, 1960 |